United States Patent [19]

Eichstaedt

[11] 4,025,103
[45] May 24, 1977

[54] PANE COVER DEVICE, PARTICULARLY FOR WINDSHIELDS AND WINDOWS OF MOTOR VEHICLES

[76] Inventor: Wolfgang Eichstaedt, Brunnenweg 18, 3331 Bad Helmstedt, Germany

[22] Filed: Oct. 22, 1974

[21] Appl. No.: 517,050

[30] Foreign Application Priority Data

Oct. 26, 1973 Germany .......................... 7338489
July 8, 1974 Germany .......................... 2432651

[52] U.S. Cl. .............................. 296/95 C; 160/368 S
[51] Int. Cl.² ............................................ B60T 1/20
[58] Field of Search ............ 296/95 C, 97 C, 97 D; 160/368 S; 24/265 C, 81 AG, 208 A, 279

[56] References Cited

UNITED STATES PATENTS

| 1,807,442 | 5/1931 | Schwartz | 296/97 D |
| 2,596,836 | 5/1952 | Bruhl | 160/368 S X |
| 2,639,751 | 5/1953 | Flaherty | 296/95 C |
| 2,690,928 | 10/1954 | Boynes | 296/95 R |
| 3,396,436 | 8/1968 | Daddona, Jr. | 24/208 A |
| 3,401,434 | 9/1968 | Daddona, Jr. | 24/208 A |
| 3,588,169 | 6/1971 | Lunt | 296/95 C |
| 3,751,100 | 8/1973 | Keyes | 296/95 C |
| 3,874,437 | 11/1973 | Black | 296/95 C X |

FOREIGN PATENTS OR APPLICATIONS

| 250,780 | 5/1963 | Australia | 24/265 C |
| 642,680 | 1/1964 | France | 296/95 C |
| 652,334 | 10/1928 | France | 24/279 |
| 1,580,155 | 7/1969 | France | 296/95 C |
| 1,284,443 | 8/1972 | United Kingdom | 180/69 R |

Primary Examiner—Robert J. Spar
Assistant Examiner—Donald W. Underwood

[57] ABSTRACT

The invention relates to a pane cover device particularly for automotive windshields and windows, consisting of a covering sheet of plastic foil, rubber, fabric or any similar substitute, with the two shorter sides of the covering sheet being provided with devices to fasten same on the windshield or window by stretching it.

The purpose of such pane cover devices is to protect the windshield, the side and rear windows of parked vehicles against icing, snow, dirt, etc. or to prevent the interior of the parked vehicle from excessive heating when exposed to sunshine.

9 Claims, 35 Drawing Figures

PANE COVER DEVICE, PARTICULARLY FOR WINDSHIELDS AND WINDOWS OF MOTOR VEHICLES

DESCRIPTION OF THE PRIOR ART

This invention relates to devices designed to cover and protect window glasses of automobiles, and the like.

Pane cover devices are already known which consist of a plastic foil of the size of the windshield and which during the night are placed on the latter, with the attachment being attained by setting the windshield wipers in such a way that they rest on the plastic foil, and further either by means of rubber or plastic suction cups placed on all 4 corners of the covering foil, or by means of plastic straps, said straps having one end welded to the plastic foil and on the other end provided with a hook which is hooked on the open vent window (German Reg. Design 1,908,089).

This pane cover only lies loosely on the windshield, with the fixing of the same calling for at least four suction cups, or the hooked plastic straps, plus the windshield wipers. Furthermore, a thin plastic foil cannot be used because due to the handling of the suction cups, they could easily be ruptured. Furthermore, this kind of pane cover is not suited for easy handling, considering that the four suction cups or hooks will have to be attached one by one individually, and that thereafter the windshield wipers will have to be set in such a way that they rest upon the covering sheet in their upright position. Finally there remains the danger of dirt and humidity penetrating between windshield and plastic foil, should the latter not cover the windshield completely as is necessary to seal off such penetration.

A pane cover device is already known which is intended to eliminate these disadvantages by means of a covering plate of plastics, rubber, or light alloy instead of the foil, with the plate being precisely the shape of the windshield and its rim being flanged toward the windshield. This plate is fixed on the windshield by means of built-in suction cups or magnets (German Reg. Design 1,956,526).

Although such a pane cover may be easier to set or remove, it is considerably more expensive in design, with a high storage volume. Furthermore, due to the fact that its design has to match precisely the shape of the windshield, said pane cover only fits one individual type of vehicle. Subsequently no low cost high volume production is possible with respect to a standard size pane cover.

Finally, another protective cover for motor vehicles is known which has a plastic bar along its upper margin carrying magnets in order to fix such cover on the windshield, with the lower part of the covering sheet being secured by means of the windshield wipers resting on same (German Reg. Design 1,989,313).

Although said pane cover may be easier to handle, as compared with the protective pane cover device described previously, there is the disadvantage of the pane cover resting only loosely on the windshield, with its lower part being secured only by the windshield wipers, and, of course, on a windy day both humidity and dirt may penetrate to the windshield.

DESCRIPTION OF THE INSTANT INVENTION

The purpose of this invention is a handy pane cover device which can be quickly and easily attached to the windshield.

A further purpose of the invention is to produce a pane cover device which tightly covers the pane at all times without requiring any additional measures for reinforcement or tighting, beyond the attachment device itself.

A further purpose of the invention is a pane cover device which may be produced with low cost mass production. It may be designed in such a way that it can be put on the market as a building set which enables the buyer to easily adjust it to the size of the windshield to be covered and to carry out the final assembly himself.

A further purpose of the invention is a pane cover device which can be easily stored when not used.

These objectives are attained by a pane cover device, particularly for windshields and windows of motor vehicles, the design of which device comprises a cover of plastic foil, rubber, fabrics or any similar substitute thereof, with its two shorter sides being provided with devices to attach same on the windshield (or window), with the innovation being that the pane cover is of a standard design and fitting windshields and windows of all shapes and sizes, and that the covering material may be stretched on, or over the windhsield due to its minor thickness, and that its two shorter sides are provided with at least one reinforcement bar each, with the latter carrying at least one fastening device each. This reinforcement bar may also be integrated into the covering material.

While most pane cover devices have to be molded according to the shape of the windshield of a particular vehicle in order to attain the necessary tight fit, the covering sheet of the pane cover device of this invention requires no molding whatsoever, since it is fastened onto the vehicle by stretching it on the windshield. Thus a low cost mass production of a standard size pane cover device is made feasible. The pane cover device of this invention is stretched on the usually curved windshield to the extent that the covering sheet fits tightly and plainly the entire windshield area to be covered, without requiring any additional and expensive reinforcement, tightening or fastening devices. The reinforcement bars either attached onto or manufactured into the two shorter sides of the covering sheet, allow the "one-point-fastening" of each shorter side and subsequently the quick, easy, plain and tight fastening of the whole cover device. The tight fitting of the cover sheet upon the windshield is attained by using quite a thin covering material.

Suction cups, magnets, straps, hooks, loops, press buttons, screw joints, or any similar substitute may be used for fastening.

Such fastening devices could for instance be located either in the neighborhood of the end of each of the reinforcement bars or approximately in the middle of each of the reinforcement bars. The latter positioning allows for the co-called "one-point-fastening" aspect advantages described above.

In a further variation of the innovation the reinforcement bars may be replaced by tension straps having elastic material in the entire length, or in one, or several sections thereof. These tension straps are preferably located on the two broader sides of the covering material, with their ends being provided with one fastening device each.

In a further development of the pane cover device of the invention, the attachment to the vehicle is attained by providing the reinforcement bars with a profile which allows its engaging, hooking or clamping in a counterpart carrying a matching profile, this counterpart is fastened onto the windshield or proximally thereto and extending itself over the entire length of the reinforcement bars, or over a section, or sections of the latter.

The invention includes various ways of attaching the covering sheet on the reinforcement bars:

A connection means between the covering sheet and the reinforcement bars may be attained by cementing, welding, or any other usual way of binding.

The covering sheet can also be attached to the reinforcement bar by interlacing the shorter sides of the covering sheet through slits provided in the reinforcement bars for this particular purpose. The shorter sides of the covering sheet may be interlaced by their full length, or in sections only. In the latter case, the proper straps on the covering sheet are included.

In a further development of the invention the slits are not cut through the reinforcement bars in a vertical angle (i.e., not rectangularly to the surface of the reinforcement bar, but rather slightly inclined towards one another, thus allowing longer slits and subsequently a reduced number of straps (i.e., cost saving and easier assembling).

Clamping the shorter sides of the covering sheet in between an upper and a lower part of a reinforcement bar would be a further approach for attaching the covering sheet on the reinforcement bar. The invention includes the following variations:

1. The underside of the upper part of the reinforcement bar is provided with pins which penetrate the shorter side of the covering sheet and which are inserted in holes introduced in the upper side of the lower part of the reinforcement bar. Thus a kind of tight riveted joint between the upper and the lower part of the reinforcement bar is attained, and at the same time securing the shorter side of the covering sheet by clamping it tightly in between the two parts.

2. The underside of the upper part of the reinforcement bar is provided with a profile which engages in a matching profile of the upper side of the lower part of the reinforcement bar in a tongue and groove fashion, securing the shorter side of the covering sheet by clamping it tightly in between the two parts. As a result the upper and lower part as well as the shorter side of the covering sheet clamped therebetween are fastened tightly together.

The upper and the lower parts of the reinforcement bar preferably are not made as completely separate portions but as conjunctive parts which are slightly linked together thus forming a common unit which can be folded. This makes the quick and unfailing joining of the upper and lower parts of the reinforcement bar easier.

Further proposals, features and advantages of the invention are given in the following detailed descriptive examples of a pane cover device as based on the invention, and with reference to the corresponding drawings given herein below:

FIGS. 8 thru 13 — various methods of connecting the coversheet and the reinforcement bar, i.e.:

FIG. 8 a.
features the covering sheet and reinforcement bar being linked together by means of cementing or welding b. same method as described in FIG. 8a, with the conjunction by means of cementing or welding alternately made on the edge of the reinforcement bar;

c. the reinforcement bar and covering sheet being made in one piece, with both being of the same material;

d. the covering sheet envelops the reinforcement bar, with the latter being of the same or of a different material;

FIG. 9
a. the shorter side of a covering sheet cut into straps;

b. a reinforcement bar with corresponding sectional slits for interlacing the straps of the covering sheet as shown in FIG. 9a;

c. and d. cross-sectional and top views of a reinforcement bar provided with slits through which the shorter side (straps) of the covering sheet is interlaced;

FIG. 10 a. the shorter side of a covering sheet without straps;

b. top view of a reinforcement bar with two uninterrupted slits;

c. and d. cut away top view of a reinforcement bar provided with two uninterrupted slits which are inclined towards each other, with the shorter side of the covering sheet interlaced through the slits;

FIG. 11 a. the top view of a reinforcement bar provided with three rows of parallel slits, b. and c. cut away view of a reinforcement bar having interlaced the shorter side (straps) of the covering sheet, with vertical slits and inclined slits, respectively;

d. top view of a reinforcement bar as shown in FIG. 11a, with the shorter side (straps) of the covering sheet interlaced;

FIG. 12 a. a schematic representation of a reinforcement bar divided into upper and lower parts, with the underside of the upper part being provided with pins and the upside of the lower part being provided with corresponding holes, and with the shorter side of the covering sheet being placed upon the lower part of the reinforcement bar;

b. a schematic representation of a reinforcement bar divided into two parts as shown on FIG. 12a, but provided with more than one row of pins and corresponding holes, with the rows staggered towards one another;

c. a cut away view of the upper and lower parts of a reinforcement bar fastened by means of pins as shown on FIG. 12b, with the shorter side of the covering sheet being clamped there between, and with the cross-sectional area cutting through two pins;

FIG. 13 a. a schematic perspective representation of a reinforcement bar, its upper part being provided with tongues and its lower part provided with grooves;

b. side view of the joined reinforcement bar as shown on FIG. 13a, with the shorter side of the covering sheet clamped in between;

c. side view similar to FIG. 13b, with the tongues and grooves however being provided with interlocking profiles;

d. a cut away view through the upper part of a reinforcement bar provided with pins and through the lower part of a reinforcement bar provided with corresponding holes, with the pins and holes having interlocking profiles similar to that shown on FIG. 13c. Furthermore, the surfaces of the facing sides of the upper part and the lower part of the reinforcement bar, in the area between the pins and the holes are fashioned in a convex and a matching concave design respectively;

e. a side view of a reinforcement bar, with its upper part and lower part being slightly linked together, thus allowing their easily being folded together;

The pane cover device consists of a covering sheet 1 of thin plastic foil, with its opposite sides, preferably the two shorter sides being provided with reinforcement bars 2, the latter either being attached to the covering sheet, for instance by soldering or cementing, entangling or interlacing, clamping or any other way of fastening, or directly working same into the covering material as reinforcement, as shown on FIGS. 8 thru 13. Instead of plastic foil, or any other plastic material, a thin sheet of rubber, fabrics or any similar substitute may be used.

Figure 1:
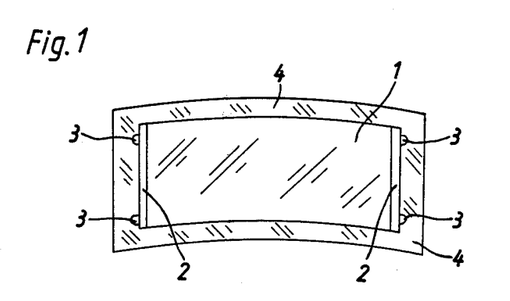
FIG. 1 — is a front view of a windshield carrying the stretched pane cover device as based on the invention, with the reinforcement bars matching the full length of the two shorter sides of the covering sheet.
Figure 2:
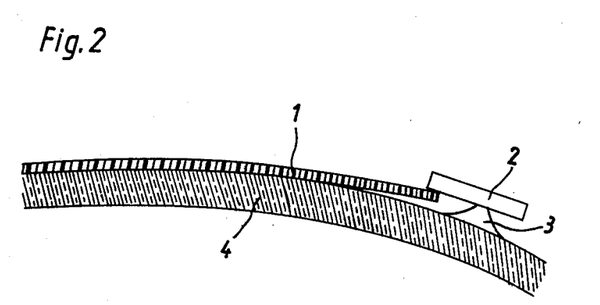
FIG. 2 — a cross-section of a windshield carrying a stretched pane cover device as based on the invention.

As shown in FIGS. 1 and 2, the underside of the reinforcement bars 2 in the neighborhood of their ends, is each provided with a suction cup 3. Said suction cup may be from any suitable rubber or plastic as commonly known in the art. It may be attached to the reinforcement bar 2 by interlocking its head into a proper hole in the reinforcement bar, while in the case of the so-called "one-point" fastening means, it still remaining swiveling. It stands to reason that the suction cups may also be attached to the reinforcement bar by means of screws, cementing, welding or any other commonly known means.

The covering sheet is stretched over a windshield 4 to the extent that the former fits the latter and plainly over the full windshield area to be covered, with the fastening being attained by means of suction cups 3. In order to fasten the reinforcement bars on the vehicle, i.e., if possible directly on the windshield to be covered or in close proximity thereto, magnets, hooks, loops, press buttons or screw joints instead of the suction cups may also be used, with the corresponding counterparts (mountings) to be fixed on the windshield 4 or in close proximity. These counterparts may for instance be cemented on a small plastic base close to the rim of the windshield (e.g. a hook for the loop, a screw for the nut), thus avoiding the need of damaging the sheet metal or the paint of the vehicle.

Further feasible systems for fastening devices are described below.

Figure 3:
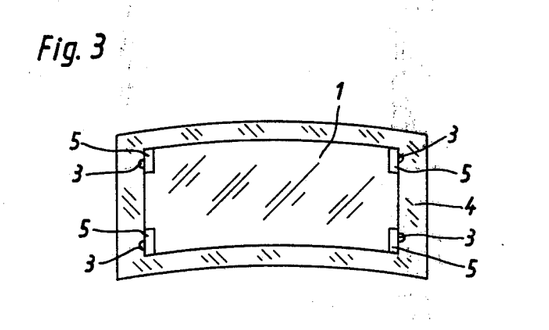
FIG. 3 — a pane cover device, with the two shorter sides of the covering sheet being provided with two sectional reinforcement bars each in the area of their fastening means only.

As shown on FIG. 1, the reinforcement bar 2 may have the full length of the two shorter sides of the covering sheet 1, or, as shown on FIG. 3, item 5, said reinforcement bars may cover the area around the fastening devices only, in order to fasten the thin plastic foil by stretching it plainly and tightly on the windshield, and in order to prevent a relatively thin foil from tearing, twisting or getting out of shape. The same reinforcement effect on the covering sheet 1 can also be attained by providing an area large enough for the fastening device, for instance of the suction cut 3 facing the covering sheet and on which the plastic foil is welded, cemented or attached in any other feasible way. In practice this would mean that the reinforcement of the covering sheet 1 is already worked into the fastening device or, in other words, has merely been transferred to the latter.

Figure 4:
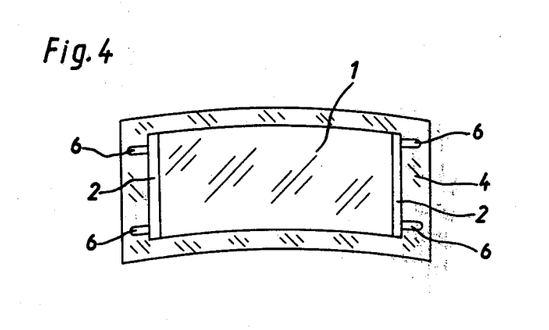
FIG. 4 — a pane cover device, with the reinforcement bars being provided with two elastic straps each as fastening means.
Figure 5:
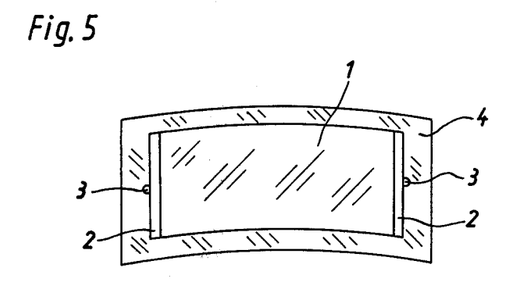
FIG. 5 — a pane cover device with two reinforcement bars being provided with a "one-point" fastening means each for attaching same on the windshield.
Figure 6:
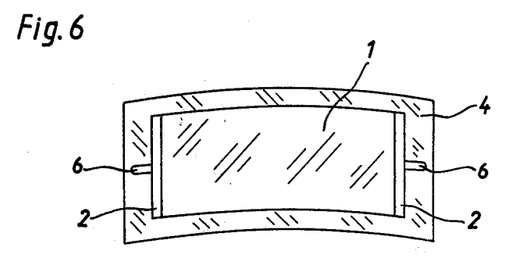
FIG. 6 — a pane cover device provided with a "one-point" fastening means fashioned as elastic straps.

In the case of an elastic or swivelling fastening device on the two shorter sides of the covering sheet, respectively, with the reinforcement bars 2 to be attached to the vehicle or the windshield 4, for instance by means of elastic straps 6 which in turn are fastened on the vehicle, or on the windshield 4 by means of suction cups or the like, as shown on FIG. 4, or by means of a one-point fastening device, for instance by means of a single swivelling suction cup 3 to be located in the middle of the reinforcement bar, as shown on FIG. 5, or by means of a single elastic, or inelastic strap attached to each shorter side of the covering sheet, or to the corresponding reinforcement bar 2 as shown on FIG. 6, the quick, plain and tight stretching of the covering sheet 1 on the windshield can be carried out in an unusually expedient manner, because the particular shorter side of the covering sheet 1 fastened first on one particular shorter side of the windshield 4 adjusts itself automatically to the position of the opposite shorter side of the covering sheet, and its corresponding reinforcement bar, when the latter is also fastened, and as a result of the stretching forces. Thus the need for subsequent individual adjusting of the shorter sides of the covering sheet or the corresponding reinforcement bars is thereby eliminated.

Figure 14:
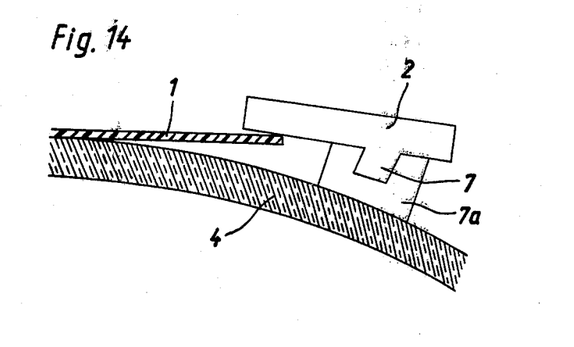
FIGS. 14 thru 16 are cut away views through the shorter side of a pane cover device similar to FIG. 2, with its reinforcement bar however being provided with a profile engaging in a counterpart with a matching profile, and with the counterpart being fastened on the vehicle.
Figure 15:
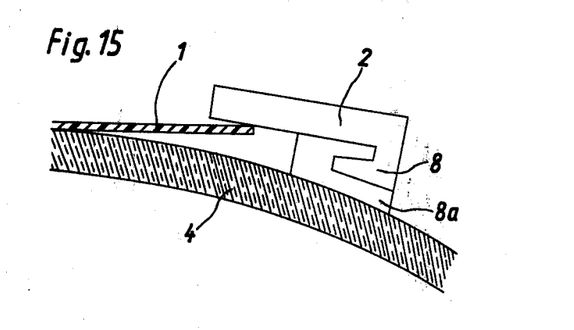
Figure 16:
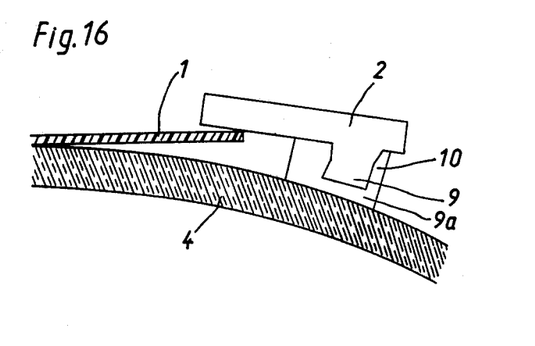

The covering sheet 1 can be tightly and simply stretched quickly by providing the reinforcement bars with a projecting profile on their lower side (7, resp. 8, resp. 9) which engages in a matching counterpart 7a attached to the windshield 4 as shown on FIG. 14, or with hooks to its counterpart 8a as shown on FIG. 15, or with clamps to its counterpart 9a as shown on FIG. 16.

The counterpart 9a as shown on FIG. 16, should be of some elasticity in order to allow for the engagement of the profile 9 of the reinforcement bar 2 into the matching counterpart 9a. In order to prevent the profile 9 from jumping out of the counterpart 9a by virtue of the tensile stresses of the stretched covering sheet 1, the elasticity of the counterpart should be confined to the area 10 which is not exposed to said tensile stresses.

Figure 7:
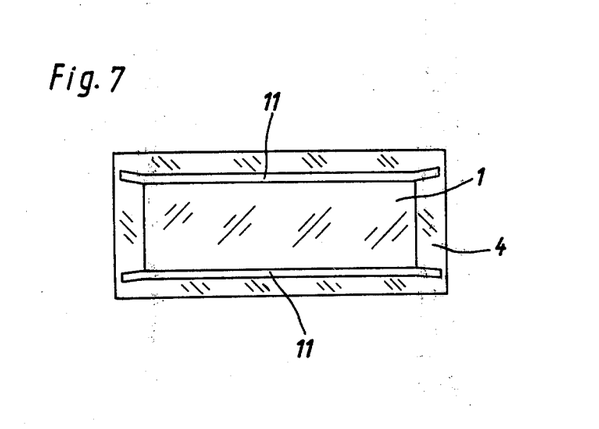
FIG. 7 — a pane cover device, with its reinforcement bars replaced by tension straps attached to the two border sides of the covering sheet.
Figure 8:
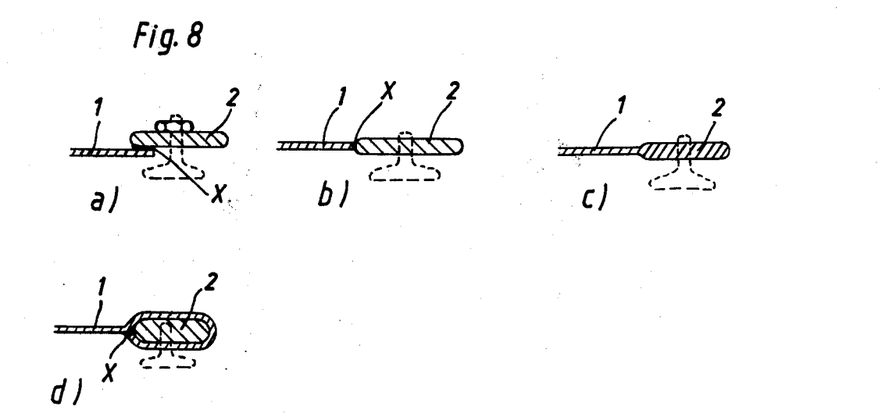
Figure 9A:
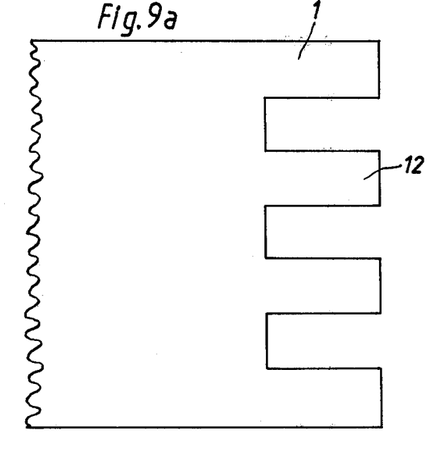
Figure 9B:
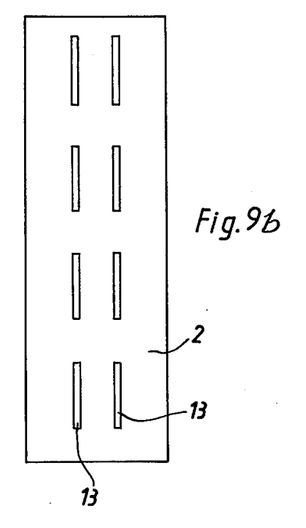
Figure 9C:
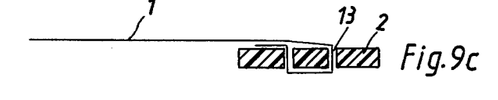
Figure 9D:
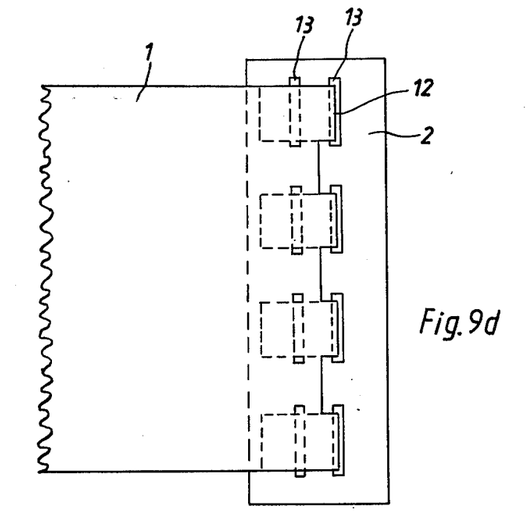

As shown on FIG. 14 thru 16, the counterpart 7a, 8a and 9a may either be of the same length as that of the reinforcement bar or they may be fashioned in shorter sections. This kind of fastening device may be located either on the two shorter sides of the covering sheet 1, or on its two broader sides. Also the counterparts or countersides 7a, 8a, and 9a may be rigidly connected to the windshield, or in proximity thereto, by any conventional technique, such as adhesive, and etc. Another advantageous feature is the three-dimensional form of the pane cover device, as shown on FIG. 7, with the reinforcement bars being replaced by tension straps 11 which may be elastic throughout their entire length or in sections thereof only. Thus another possibility is to use a relatively thin, i.e. inexpensive plastic foil to be stretched upon the windshield of parked vehicles. The tension straps 11 which may as well be built into the covering sheet 1 as border reinforcement, are attached to the two broader sides and/or to the two shorter sides of the covering sheet, with the ends of the tension straps being fastened onto the vehicle's windshield 4 in such a way that the plastic foil is stretched plainly and tightly over the full area to be covered. The fastening thereto may also be attained by means of suction cups, magnets, hooks, loops, press buttons or any similar substitute.

As already described above, the covering sheet 1 may be fastened on the reinforcement bar 2 by cementing, welding or any other method commonly known. However the invention also contemplates other methods of fastening as described in the following with reference to FIGS. 9 thru 13.

The covering sheet 1 can also be attached to the reinforcement bar 2 by interlacing the shorter side of the covering sheet through coordinating slits provided in the reinforcement bars for this particular purpose. The shorter sides of the covering sheet 1 may have their entire length interlaced therein, as shown for instance in FIGS. 10a thru 10d, or they may be interlaced in sections only, as shown for instance in FIGS. 9a thru 9d. These sections are formed by cutting the shorter sides of the covering sheet 1 into straps. As shown on FIGS. 9c thru 9d, these straps are interlaced through at least two parallel rows of slits 13, introduced for this purpose in the reinforcement bar 2.

Considerably longer slits and a subsequently reduced number of straps resulting in easier and cost saving assembling can be attained by cutting the slits on an angle, as shown on FIG. 10c, instead of cutting the slits in a vertical angle to the surface of the reinforcement bar, the advantage being that the remaining section 14 between the slits 15 which is interlaced by the shorter side of the covering sheet (the straps 12 as shown on FIG. 9a), will be clamped in a wedging fashion between the main part of the reinforcement bar, together with the shorter side of the covering sheet, as a result of the stretching forces of the covering sheet 1. Subsequently the danger that, due to the stretching forces of the covering sheet, the section 14 between the slits 15 will release the shorter side of the covering sheet by bending toward the direction of said stretching forces is eliminated.

Still greater stretching forces for the covering sheet can be attained by using reinforcement bars provided with three parallel rows of slits 16 for interlacing the straps 12 of the covering sheet 1. This design calls for two intersectional strips 17 around which the straps may be interlaced (FIG. 11a thru 11d).

Figure 10A:
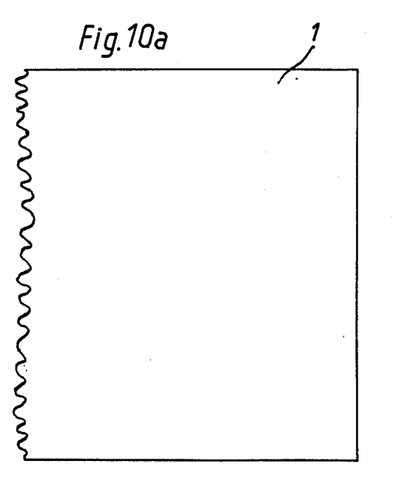
Figure 10B:
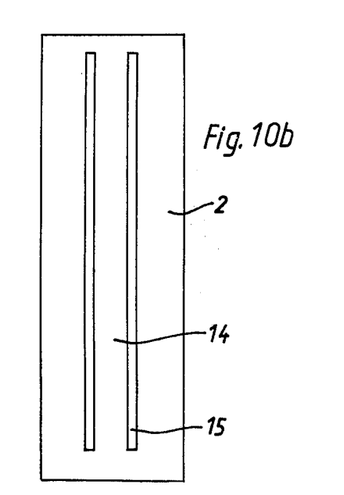
Figures 10C, 10D:
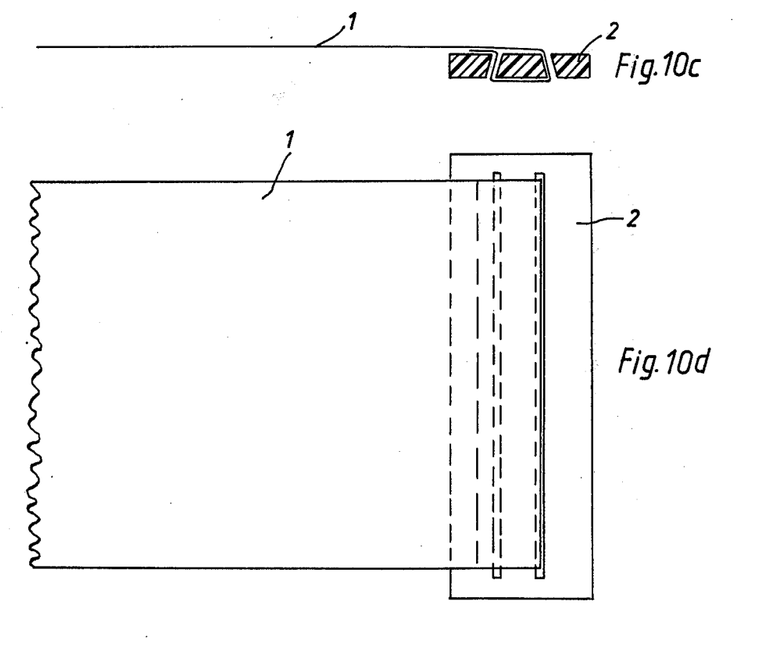

The method of wedging the various intersectional strips in the reinforcement bar inclining the slits as described with relation to FIG. 10c can also be applied to a reinforcement bar provided with more than two parallel slits, or with more than two rows of parallel slits. Such an alternative reinforcement bar 2 carrying at least three parallel slits is shown on FIG. 11c.

Figure 11A:
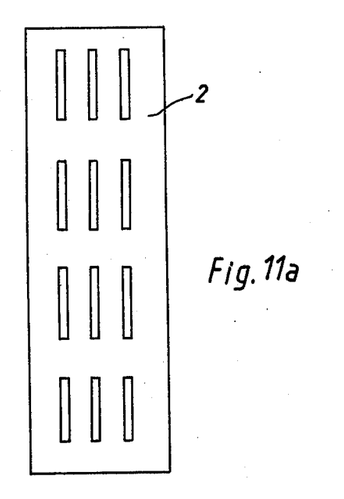
Figure 11B:
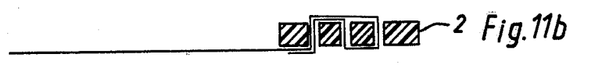
Figure 11C:
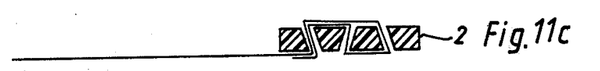
Figure 11D:
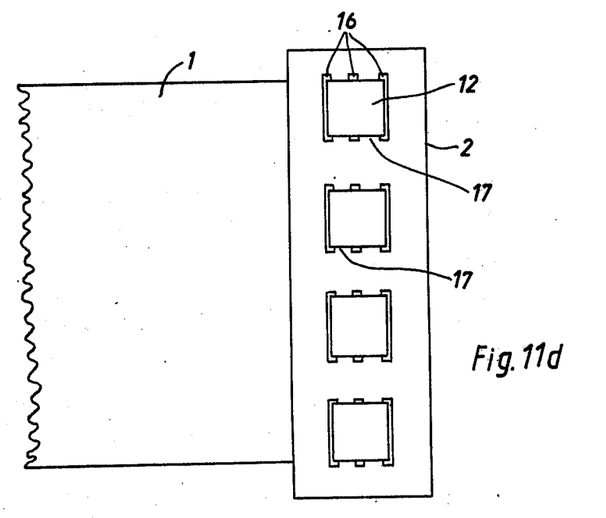

FIG. 11d shows a top view of a shorter side of this covering sheet 1, with its straps 12 being interlaced through a reinforcement bar 2. In this case, the reinforcement bar is provided with three parallel rows of sectional slits 16 as extended over sections of the reinforcement bar.

A further method of fastening the covering sheet 1 to the reinforcement bar 2 is by clamping the shorter side of the covering sheet in between the reinforcement bar 2 which is divided into an upper part and a lower part. By this clamping joint method, the covering sheet is firmly clamped between the upper part and the lower part, but in the same process said upper and lower parts of the reinforcement bar should be firmly bound. The following is a method of solving this problem, as based on the invention.

Figure 12A:
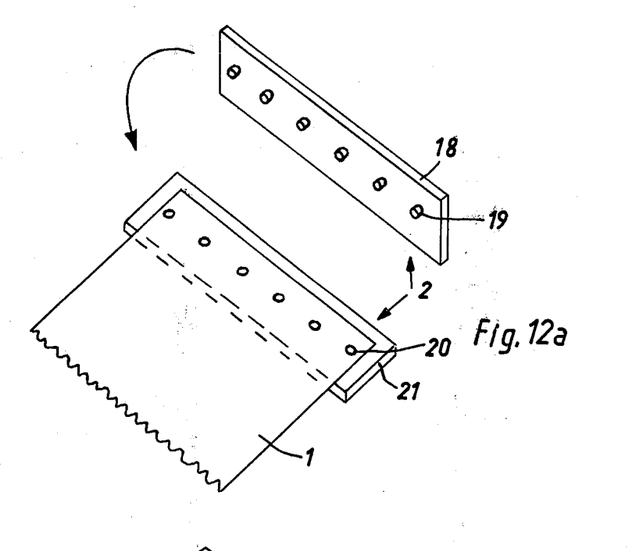
Figure 12B:
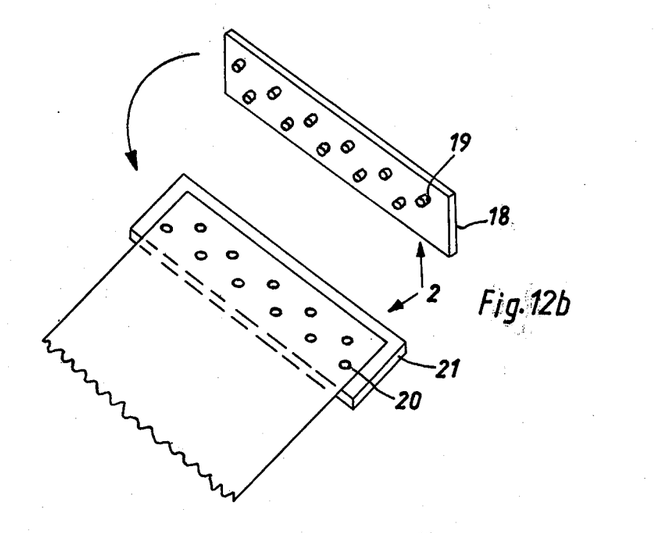
Figure 12C:
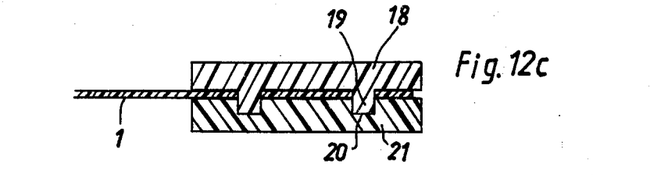

As shown on FIG. 12a thru 12c, pins or pegs 19 are formed or set on the underside of the upper part 18 of the reinforcement bar 2. These pins 19 penetrate the shorter side of the covering sheet 1 to be fastened and are inserted into holes 20 formed on the upper side of the lower part 21 of the reinforcement bar 2. By pressing the upper part 18 and the lower part 21 together, a tight riveted joint between the two parts it attained, while at the same time securing the shorter side of the covering sheet by clamping it tightly in between the two parts, as indicated in the cut away view shown on FIG. 12c. For this purpose, the upper part 18 of the reinforcement bar is provided with either one row of pins 19, as shown on FIG. 12a, or with two rows of pins 19 staggered towards one another, as shown on FIG. 12b.

Figures 13A, 13B:
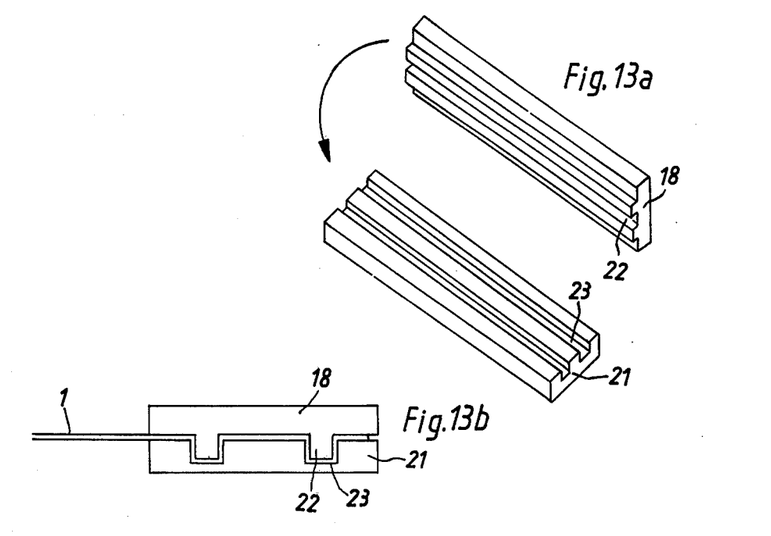

FIG. 13a shows the underside of the upper part 18 of the reinforcement bar 2 being provided with tongues 22 which engage in matching grooves 23 on the upper side of the lower part 21. In FIG. 13b, the upper part 18 and the lower part 21 of the reinforcement bar 2 with the shorter side of the covering sheet 1 in between are firmly joined together.

Figure 13C:
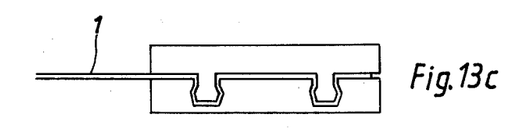

The firm engagement of the upper part 18 and the lower part 21 of the reinforcement bar 2 as well as the firm clamping of the shorter side of the covering sheet 1 in between is particularly effective with the tongue 22 and groove 23 design as shown in FIG. 13c. This kind of design results in an interlocking joint having particular firmness.

Figure 13D:
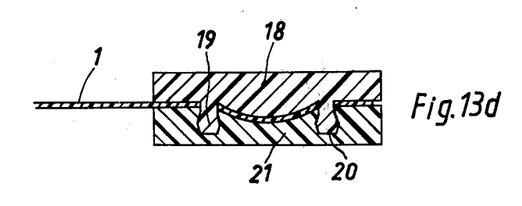

When the upper part 18 and the lower part 21 of the reinforcement bar 2 are bound by means of pins, a particularly firm joint for clamping of the shorter side of the covering sheet 1 is attained by providing the facing sides of upper part and lower part of the reinforcement bar with a convex and a respective matching concave design, as shown in FIG. 13d. As further shown in this figure, the pins 19 and holes 20 may also be of an interlocking design such as shown in FIG. 13.

Figure 13E:
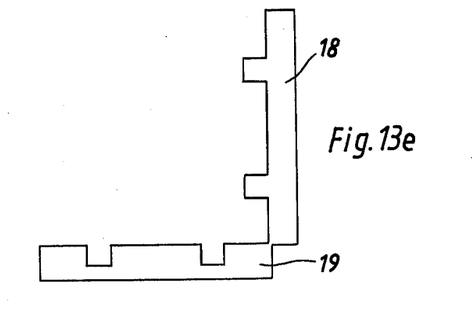

An easy and unfailing assembly joining the upper part 18 and the lower part 21 of the reinforcement bar 2 will be attained by not producing both parts as separate pieces but rather as conjunctive parts which are linked together slightly, i.e., as a common unit to be folded, as shown in FIG. 13e. This kind of hinged joint between the upper part 18 and the lower part 21 can be easily attained by producing a reinforcement bar in one piece by means of plastic injection molding.

As a logical further development, the methods as shown in FIGS. 9 thru 13, i.e., that of interlacing the shorter side of the covering sheet through the reinforcement bar 2 or that of clamping the former in between the latter can easily be combined with the type of reinforcement bars as shown in FIGS. 14 thru 16.

Thus the invention creates a pane cover device which can be manufactured at low cost, and having a standard size of same which can be used on vehicles of different types, which is highly useful and at the same time unusually handy. Since the reinforcement bars and the covering sheet allows it to be wrapped or folded when not being used, this pane cover device is also unusually convenient with regard to storage thereof.

The pane cover device design as described with relation to FIGS. 9 thru 13 and based on the invention offers additional advantages with regard to cost of production and the possibility of adjusting the pane cover to the varying sizes of windshields (panes) to be covered. Not only can the pane cover device be put on the market as a building set to be assembled by the buyer himself, but the buyer can also cut the covering sheet to the size of the particular windshield (pane) to be covered.

Figure 17:
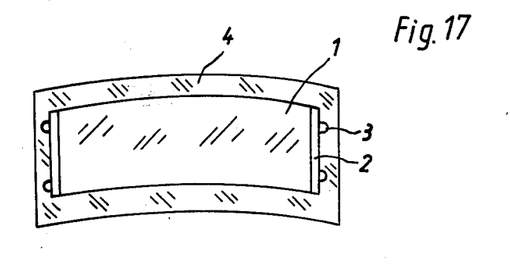
FIG. 17 — a pane cover device as based on the invention carrying advertising print.

The pane cover device as invented can also be used with considerable advantage for advertising purposes, for instance by printing company names, trademarks, advertising slogans, pictures, etc. thereon, as shown on FIG. 17.

It stand to reason that the invention is not strictly limited to the applicational forms as described above and shown in the drawings. For the expert many possibilities of deviations and improvements may arise from the invention. It shall further be made clear that the pane cover device can be used on all types of panes, in other words its application is not limited to windshields only.

What is claimed is:

1. A pane cover, particularly for windshields and windows of motor vehicles, comprising:
    a covering sheet comprised of stretchable material, with said covering sheet being of a standard size so as to fit any window glass area shape;
    at least one reinforcement bar at each of the two opposite sides of said sheets, said each bar comprising closed contour slits for interlacing said cover into said reinforcing bar; and
    fastening means, fashioned on each of said reinforcement bar, for fastening the bar to the window glass area, said fastening means comprising a projecting portion extending the length of the respective reinforcement bar and a counterpart portion attached to the vehicle for frictionally inserting said projecting portion therein whereby said counterpart portions of said fastening means are spaced from each other at distances greater than the unstretched length of said pane cover such that said pane cover is caused to be tightly and simply stretched to fit against the windshield when in position.

2. The pane cover as claimed in claim 1 wherein the covering sheet may accommodate a design bearing means.

3. The apparatus of claim 1 wherein said slits have a longitudinally axis, said bar comprises a plurality of slits whose axes are parallel.

4. The apparatus of claim 3 wherein said bar comprises at least two parallel longitudinal slits for interlacement of said cover therein.

5. The apparatus of claim 4 wherein said parallel longitudinal slits are inclined toward each other and toward a surface of the reinforcement bar.

6. The apparatus of claim 4 wherein said bar comprises three parallel longitudinal slits.

7. The apparatus of claim 3 wherein said bar comprises at least two rows of parallel longitudinal slits for interlacement of said cover therein.

8. The apparatus of claim 7 wherein said parallel longitudinal slits are inclined toward each other and toward a surface of the reinforcement bar.

9. The apparatus of claim 7 wherein said bar comprises three rows of parallel longitudinal slits.

* * * * *